United States Patent [19]
Marino et al.

[11] Patent Number: 5,188,240
[45] Date of Patent: Feb. 23, 1993

[54] STORAGE UNIT FOR RECORDING-MEDIA BOXES

[75] Inventors: Peter C. Marino, Denver, Colo.;
Robert K. Hanson, P.O. Box 1392, Cambridge, Ohio 43725; Joseph C. Marino, Denver, Colo.

[73] Assignee: Robert K. Hanson, Cambridge, Ohio

[21] Appl. No.: 726,237

[22] Filed: Jul. 5, 1991

[51] Int. Cl.$^5$ ............................................ A47G 19/08
[52] U.S. Cl. ............................ 211/41; 206/309; 312/9.58; 211/163
[58] Field of Search .............. 211/41, 40, 78, 144, 211/163, 56, 58, 59.4; 206/309, 387; 312/9, 10, 11; 248/158, 159

[56] References Cited

U.S. PATENT DOCUMENTS

| | | | |
|---|---|---|---|
| 570,338 | 10/1896 | Reed | 211/41 |
| 689,213 | 12/1901 | Nicholson | 211/78 |
| 3,337,059 | 8/1967 | Le Hoy | 211/40 X |
| 3,682,083 | 8/1972 | Puente | 211/41 |
| 3,756,581 | 9/1973 | Albertini | 211/41 X |
| 3,907,116 | 9/1975 | Wolf et al. | 211/40 |
| 4,228,902 | 10/1980 | Schulte | 211/41 |
| 4,531,645 | 7/1985 | Tisbo et al. | 211/163 X |
| 4,707,247 | 11/1987 | Savoy | 211/40 X |
| 4,872,554 | 10/1989 | Quernemoen | 211/41 X |
| 4,911,308 | 3/1990 | Nylund | 211/41 |

FOREIGN PATENT DOCUMENTS

2037157 7/1980 United Kingdom ................ 211/41

*Primary Examiner*—Carl D. Friedman
*Assistant Examiner*—Korie H. Chan
*Attorney, Agent, or Firm*—Paul E. Milliken

[57] ABSTRACT

A storage unit or rack for recording-media boxes such as CD boxes or other such containers which rack supports the boxes in a series of parallel substantially horizontal planes or in planes inclined at some other angle. The rack has one or more pairs of sidewalls lying in planes which intersect at right angles and which engage two adjacent side edges of each box and leave the other two side edges of each box facing outwardly and exposed so that they are visible for reading labels on the boxes and to provide easy access for placement and removal of such boxes.

27 Claims, 10 Drawing Sheets

STORAGE UNIT FOR RECORDING-MEDIA BOXES

This invention relates to a storage unit or rack for recording-media boxes such as CD boxes or other such containers. The rack supports the boxes along two adjacent side edges thereof in a series of parallel substantially horizontal planes or in planes inclined at some other angle. The rack is open in the area of the other two side edges of the boxes so that they are visible for reading any labels thereon and for easy placement and removal of the boxes.

BACKGROUND OF THE INVENTION

With the continued development of various types of recording media such as compact disks, (CDs), video cassettes and the like and the containers therefor, various specially designed storage racks have been devised for orderly storage of such recording-media and the containers in which the recordings are enclosed.

A typical container for CDs is shown in U.S. Pat. No. 4,903,829 issued to P M Clemens. Containers of this type may be stored in racks such as those shown in U.S. Pat. Nos. 4,655,345; 4,779,730; and 4,889,244. All these racks support the containers standing on edge in a vertical position. While these racks serve their intended purpose, some are more complex that necessary, more difficult to manufacture and some may not be as aesthetically pleasing as they could otherwise be.

OBJECTS OF THE INVENTION

It is a primary object of this invention to provide a storage unit for a recording-media box which is simple, inexpensive to manufacture and is aesthetically pleasing Another object of this invention is to provide a modular storage unit for a recording-media box which is versatile and may be expanded by adding additional storage sections when needed.

A still further object of this invention is to provide a storage unit for a recording-media box which supports the boxes in such manner that the labels thereon may be easily read for making a selection of which recordings are to be played and the boxes may be easily placed in or removed from the storage unit.

Another object of this invention is to provide a storage unit for a recording-media box which is rotatable about a vertical axis for more easily viewing all the labels on the boxes stored therein.

These and other objects of the invention will become more apparent in the following specification and the attached drawings.

SUMMARY OF INVENTION

This invention is a storage unit for recording-media boxes the unit having at least one first wall member lying in a first plane, at least one second wall member lying in a second plane which intersects at a common axis with and is substantially perpendicular to the first plane, and a connecting means attached to all of the wall members to hold them in fixed angular and spatial relationship to each other, at least one face of each wall member having a series of alternating transversely extending parallel ribs and grooves, the ribs and grooves on each first wall member being in such a position as to lie in a plurality of parallel planes which are common to the ribs and grooves on an adjacent second wall member wherein each groove on a first wall member is aligned in a common plane with an adjacent groove on a second wall member so that each such set of adjacent grooves will receive and support a pair of adjacent sidewall edges of a recording-media box in a plane parallel to other media boxes similarly supported by other sets of grooves in the wall members.

DESCRIPTION OF THE PREFERRED EMBODIMENTS

Figure 1:
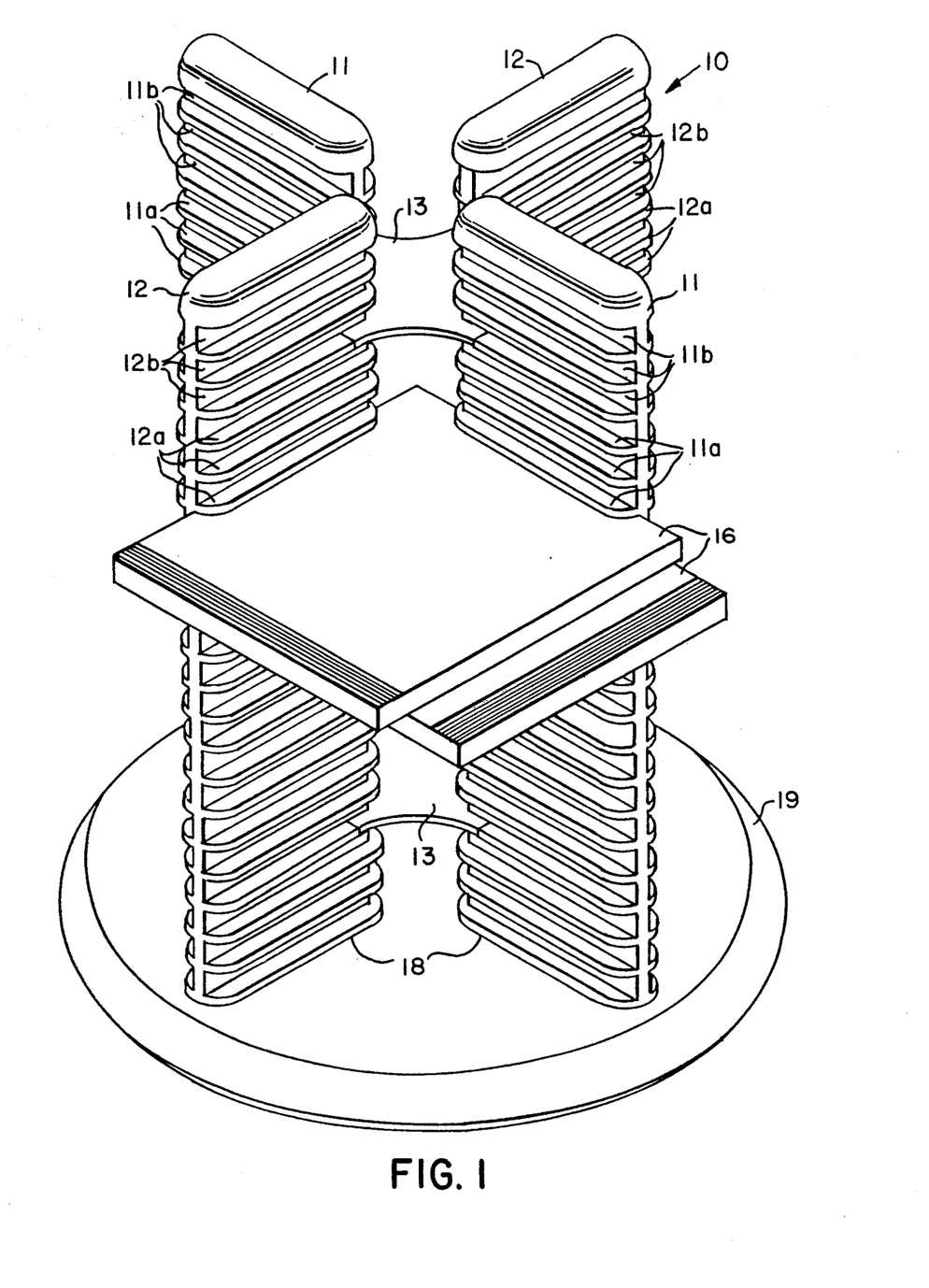
FIG. 1 is an isometric view of one embodiment of the invention.

Referring now to the drawings and in particular to FIG. 1, a storage unit or rack for recording-media boxes is indicated generally by the numeral 10. The rack 10 may be used to store compact discs (CDs), audio or video cassette boxes or the containers for various other recording-media depending upon the size and arrangements of the retaining ribs and grooves as will be explained later.

The embodiment of the rack 10 in FIG. 1 has a first pair of substantially identical wall members 11 spaced apart from each other and lying in a common vertical plane. The rack 10 also has a second pair of substantially identical wall members 12 spaced apart from each other and lying in a common vertical plane which is perpendicular to and intersects the plane of the first pair of walls 11 at a common vertical axis which is centrally located between all the walls 11 and 12. The walls 11 and 12 are all interconnected to each other in fixed angular and spatial relationship by a pair of brackets 13 shown in greater detail in FIG. 10.

Figure 10:
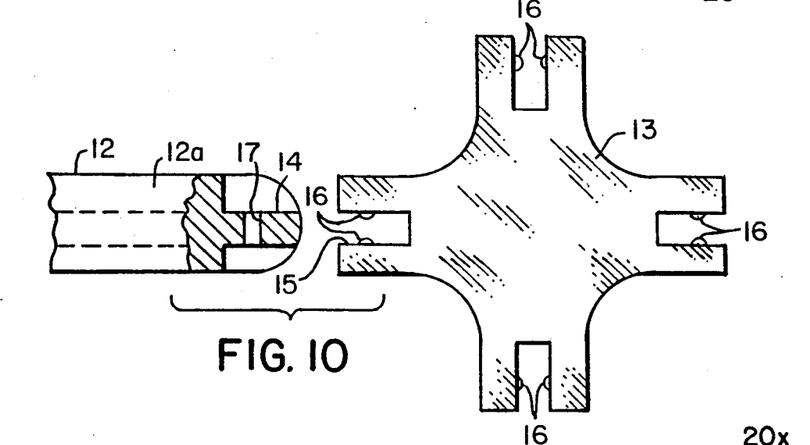
FIG. 10 is an enlarged fragmentary exploded view showing how the retaining bracket connects to a wall member.

Referring now to FIG. 10, a bracket 13 is shown in position for connection to a wall member 12 by means of a tongue and groove type connection in which the a portion of the rib 12a is removed on each side to form a tongue 14 which fits into one of the four slots or grooves 15 in the bracket 13. A pair of opposed inwardly facing humps or buttons 16 snap into engagement with a hole or depression 17 in each side of the tongue 14 to firmly lock the wall member 12 and bracket 13 together. All the other wall members 11 and 12 attach to the bracket 13 in the same manner. This type of connection is particularly well suited to a rack made from molded plastic which has the desired resiliency to permit the snap in type interlocking feature.

Figure 6:
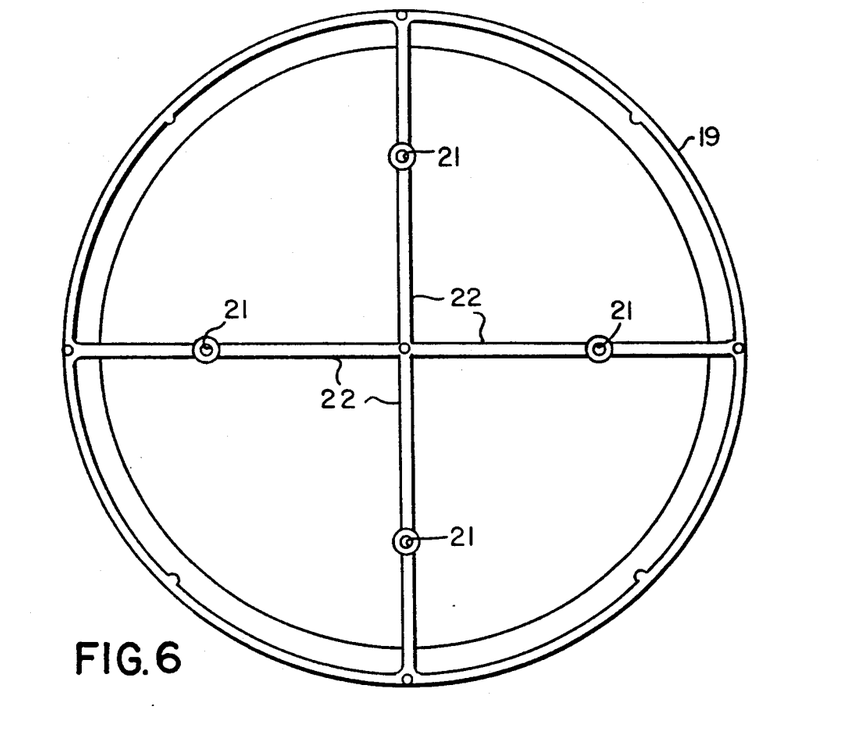
FIG. 6 is a bottom plan view of the base member of the embodiment shown in FIGS. 1, 2 and 3.
Figure 7:
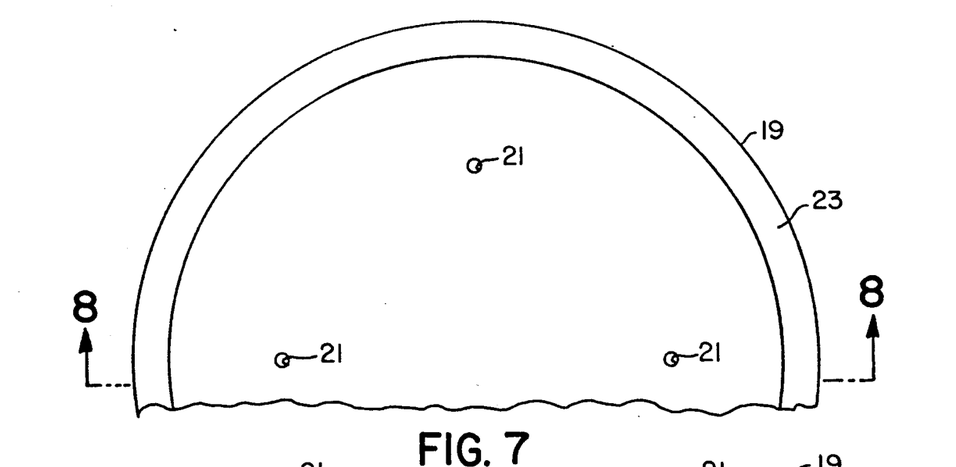
FIG. 7 is a fragmentary top plan view of the base member shown in FIG. 6.
Figure 8:
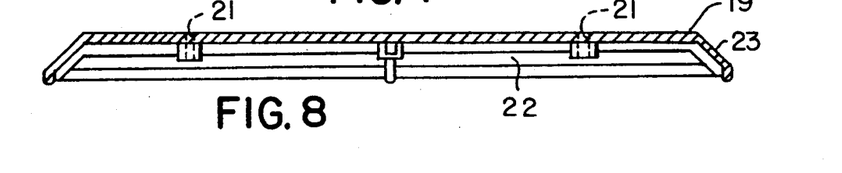
FIG. 8 is a sectional view taken on line 8—8 of FIG. 7.
Figure 9:
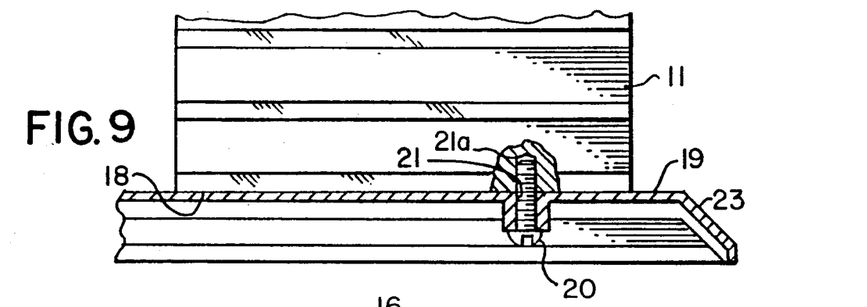
FIG. 9 is a fragmentary sectional view showing a typical connection of a base member to a wall member.

The bottom edge 18 of each wall member 11 and 12 is attached to a circular base member 19 by screws 20 as shown in FIG. 9. The screws 20 pass through holes 21 in the base 19 which is shown in more detail in FIGS. 6 through 8 and then screw into threaded holes 21a in the wall member 11. The base 19 is in the shape of an inverted saucer and has radially extending reinforcing webs 22 and a downwardly extending edge flange 23 around the circumference of the base 20.

Each adjacent pair of walls 11 and 12 form a right angle with each other so that the rack 10 contains four right angle corners. Each side of each wall 11 contains a series of alternate transverse ribs 11a and grooves 11b lying in a series of parallel substantially horizontal planes. Each side of each wall 12 contains a series of alternate transverse ribs 21a and grooves 12b lying in a series of substantially parallel planes. Each groove 11b or 12b is of sufficient width to receive the type of recording media box that is to be stored on the rack 10. When the walls 11 and 12 are assembled in operative position on the base 15, each groove 11b lies in a common plane with a matching groove 12b and thereby permits a recording-media box 16 to be positioned in any pair of the adjacent grooves 11b and 12b as shown in FIG. 1 with two adjacent edges of the box 16 being engaged by two adjacent grooves 11b and 12b. In instances where the boxes 16 are longer in one dimension than in the other, the boxes can be alternately turned with every other box having the length in one direction and every other alternate box having the length in the opposite direction as show by the two boxes 16 in FIG. 1. With this arrangement one edge of each box 16 sticks out further than the adjacent edge of the box 16 on either side to make it easier to grasp the box for removal from the rack 10.

Figure 2:
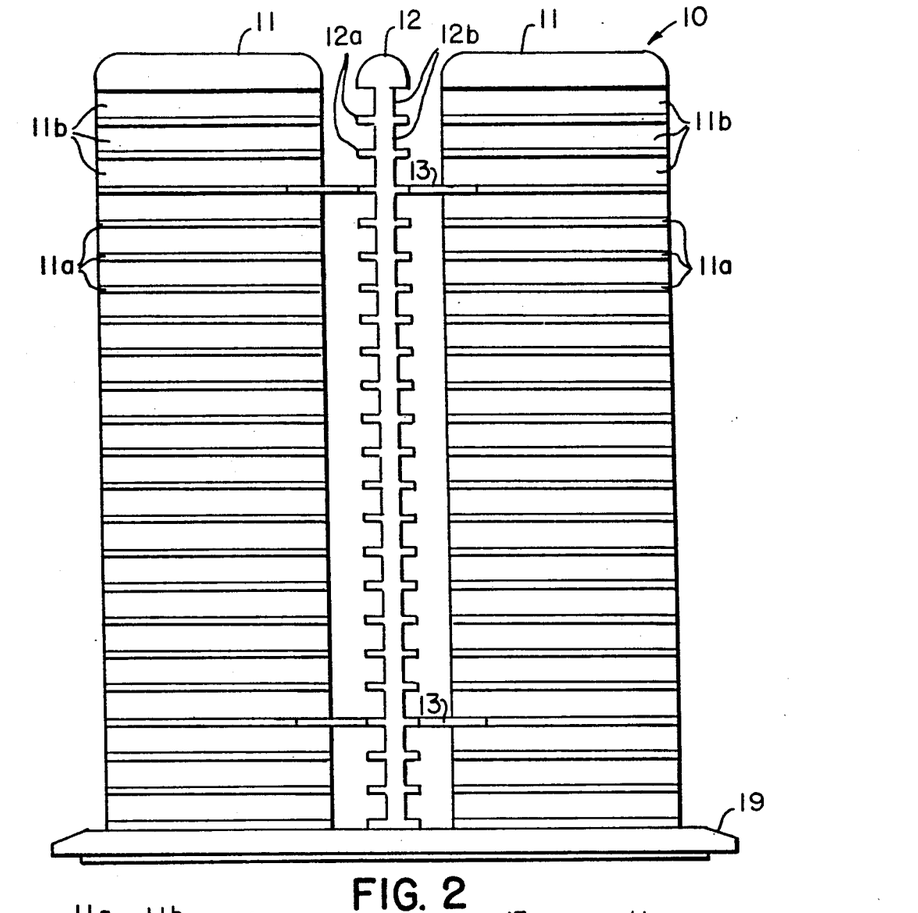
FIG. 2 is a front elevational view of the embodiment shown in FIG. 1.
Figure 3:
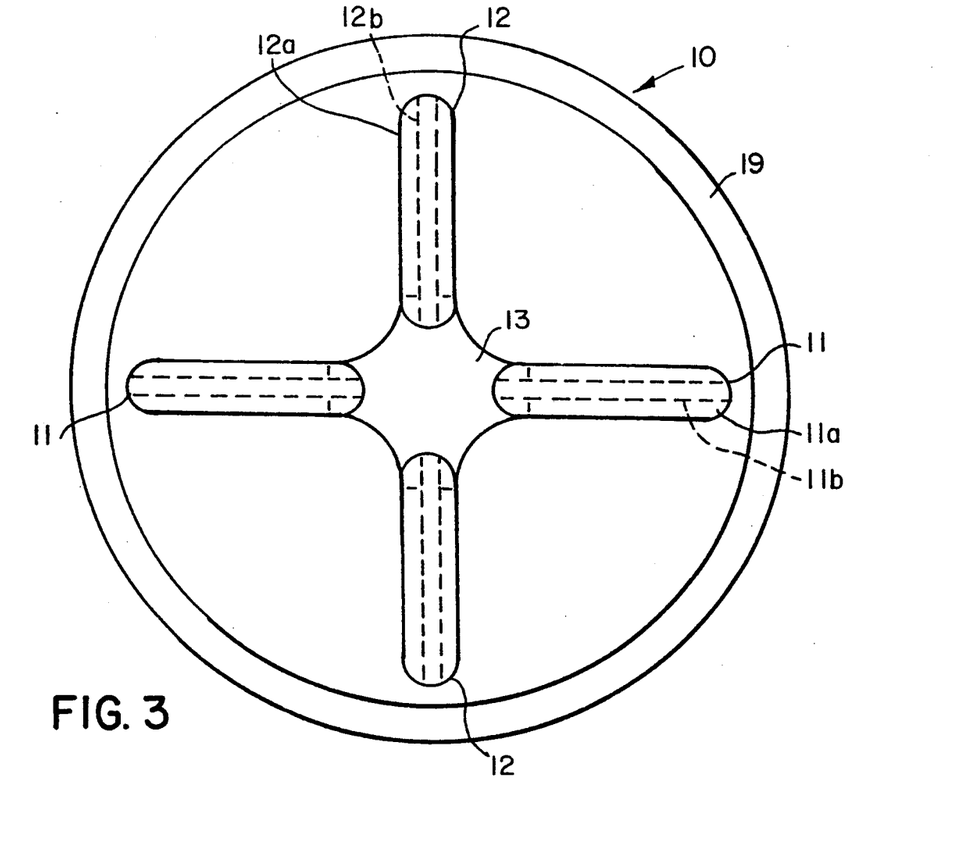
FIG. 3 is a top plan view of the embodiment shown in FIGS. 1 and 2.

FIGS. 2 and 3 illustrate the appearance of other views of the embodiment of rack 10 shown in FIG. 1 with similar parts being identified by similar numbers for simplicity.

Figure 4:
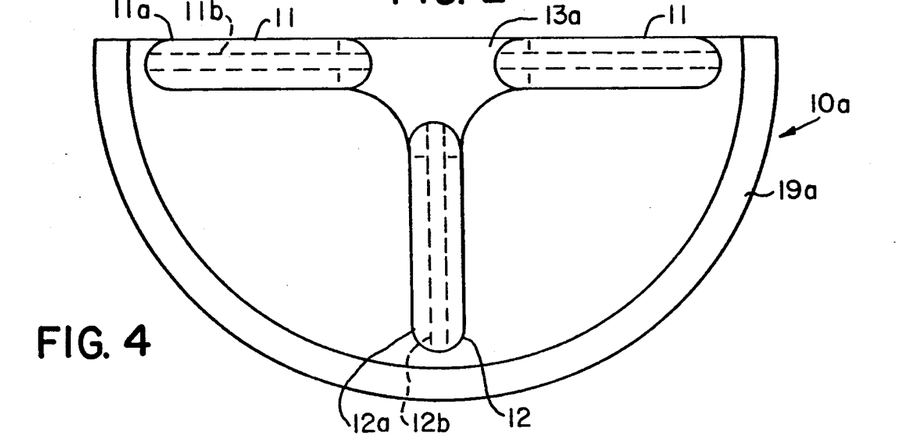
FIG. 4 is a top plan view of another variation of the embodiment shown in FIGS. 2 and 3.

FIG. 4 shows an embodiment similar to FIGS. 1 though 3 but with only three of the vertical wall members, i.e. two wall members 11 and one member 12. This embodiment has a truncated base 19a instead of the circular base 19 in FIGS. 1 through 3 and a truncated bracket 13a connecting the members 11 and 12. FIG. 2 can also serve as the front elevational view of FIG. 4 since it would look identical to the same view of FIG. 3.

Figure 5:
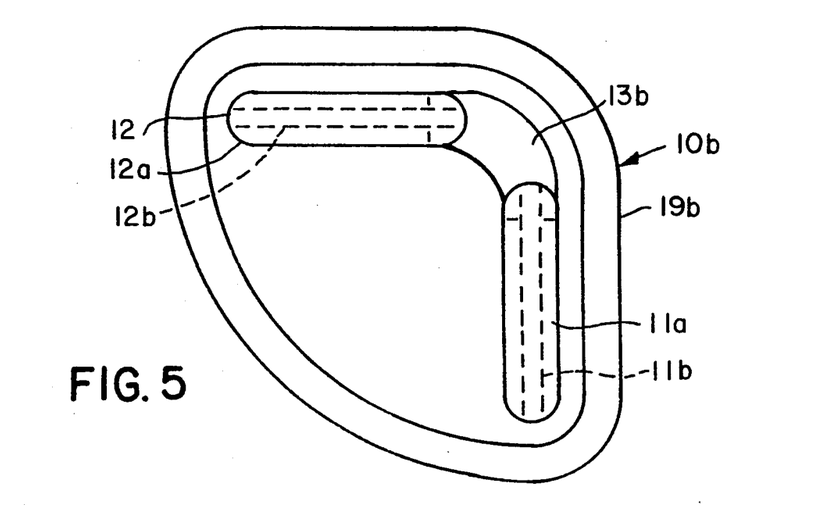
FIG. 5 is a top plan view of still another variation of the embodiments shown in FIGS. 3 and 4.

FIG. 5 shows a further embodiment having only one vertical wall 11 and one vertical wall 12. The base 19b is in shape of a modified triangle and the walls 11 and 12 only form one square corner for retaining a stack of recording-media boxes. The wall members 11 and 12 are connected together at a right angle to each other by a bracket 13b.

Figure 11:
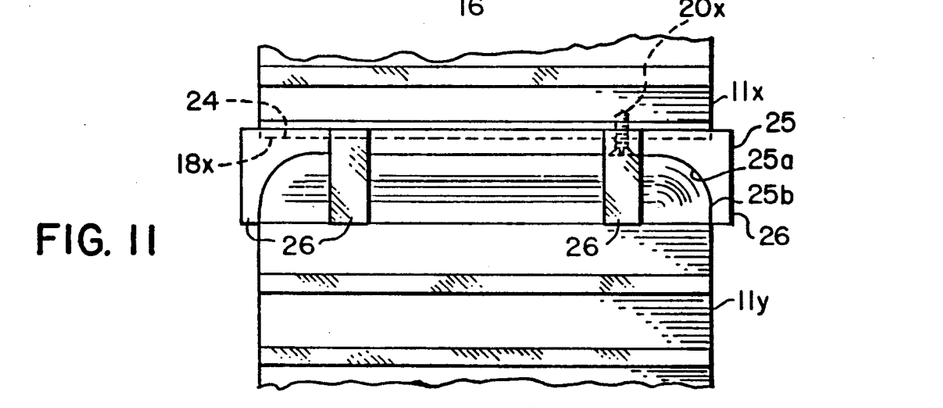
FIG. 11 is a fragmentary front elevational view showing a modular stacking embodiment of the invention.
Figure 12:
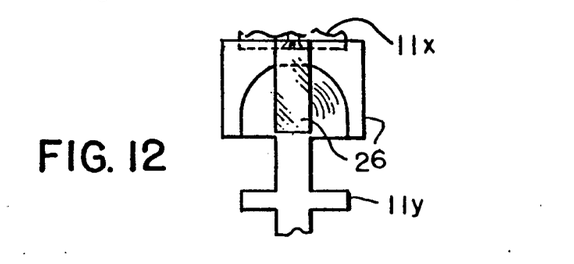
FIG. 12 is a fragmentary end view of the embodiment shown in FIG. 11.

FIGS. 11 and 12 illustrate how the wall members 11 and 12 may be divided into stacked sections with a top section 11x being stacked on top of a bottom section 11y. The lower edge 18x of the top section 11x fits into a recess 24 in an adapter 25 which has a concavely curved portion 25a that mates with a convexly curved portion 25b on the upper edge of the bottom section 11y. A screw 20x holds the top section 11x in the recess 24 of the adapter 25. The adapter 25 also has downwardly extending tabs 26 which engage the bottom section 11y and aid in retaining the adapter 25 and top section 11x in place.

Figure 13:
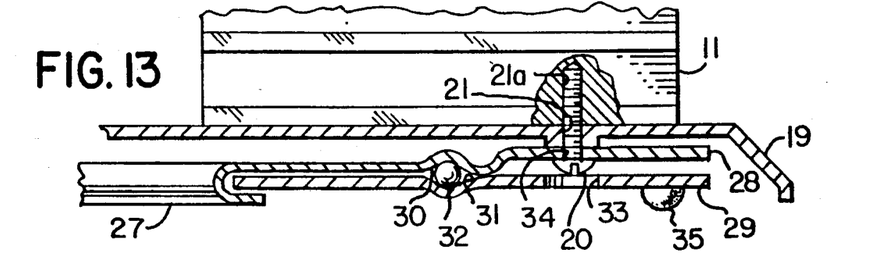
FIG. 13 is a fragmentary sectional view showing a typical connection between a base member and an vertical wall member with the base member mounted on a lazy susan.

FIG. 13 illustrates another modification in which a lazy susan 27 is attached to the base 19 and to vertical wall members 11 and 12 by screws 20. The lazy susan is made of an upper plate 28 and a lower plate 29 which are rotatable with respect to each other. Both the upper plate 28 and lower plate 29 have axially annular grooves 30 and 31 which form a bearing race for a plurality of ball bearings 32. The screws 20 are passed through access holes 33 in the lower plate 29 and then through holes 34 in upper plate 28 and holes 21 in the base member 19 and then are screwed into threaded holes 21a in the wall member 11. The lower plate 29 has a plurality of foot pads 35 on the bottom thereof to protect any surface upon which the rack 10 is placed when in use.

Figure 14:
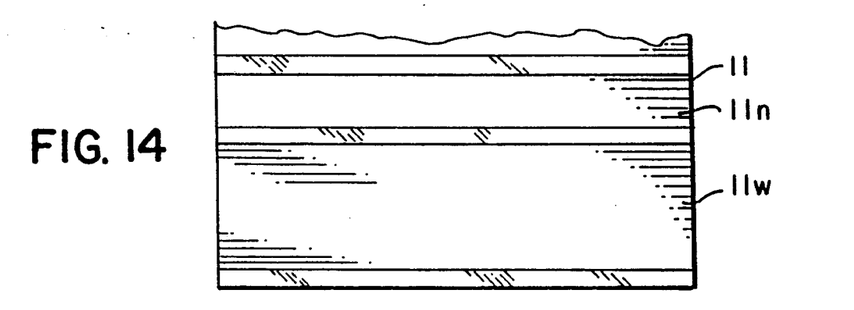
FIG. 14 is a fragmentary front elevational view showing a vertical wall member having grooves of multiple widths.

FIG. 14 shows another modification of the invention with a typical vertical wall member 11 having multiple width grooves with a wide groove 11w and a narrow groove 11n to handle different thicknesses of boxes on the same rack.

Figure 15:
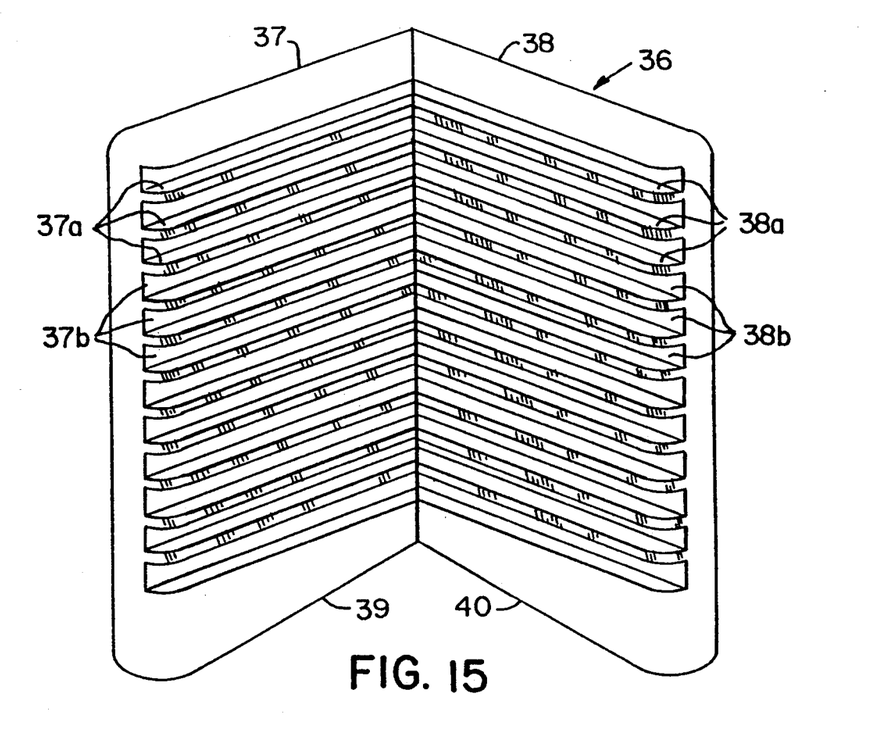
FIG. 15 is an isometric view of another embodiment of the invention having a two inclined walls.

FIG. 15 is another embodiment of the invention in which a recording-media rack indicated generally by the numeral 36 made up of an upwardly extending wall member 37 and an upwardly extending wall member 38 which are mirror images of each other and are joined together at a right angle at a miter joint by an adhesive, screws (not shown) or any other suitable fastening means. The walls 37 and 38 have a series of alternate transverse ribs 37a and 38a with grooves 37b and 38b respectively between each pair of ribs. The walls 37 and 38 lie in planes which intersect at a common axis which extends upwardly but which is inclined rearwardly of the rack at an angle of approximately 10° from a perpendicular axis when the rack 36 is positioned on a horizontal surface. This is accomplished by truncating the bottom edges 39 and 40 of the walls at such an a proper angle to tilt the entire rack 36 rearwardly and thereby place the ribs 37a and 38a and the grooves 37b and 38b on a rearwardly inclined plane with respect to a horizontal plane. These inclined grooves 37b and 38b will in turn hold the recording-media boxes therein more securely than if on a horizontal plane.

Figure 16:
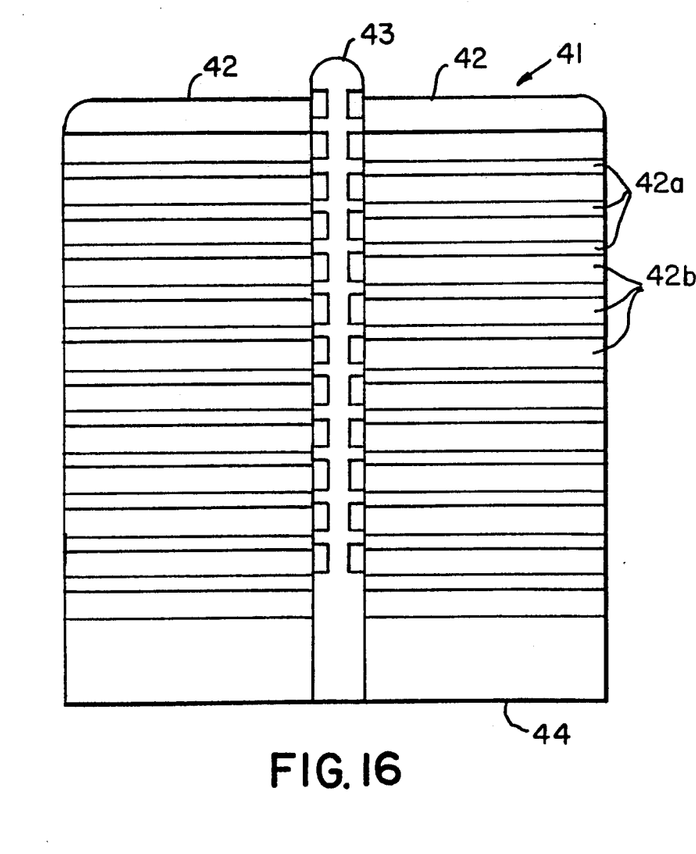
FIG. 16 is a front elevational view of another embodiment of the invention having one vertical wall and one inclined wall.
Figure 17:
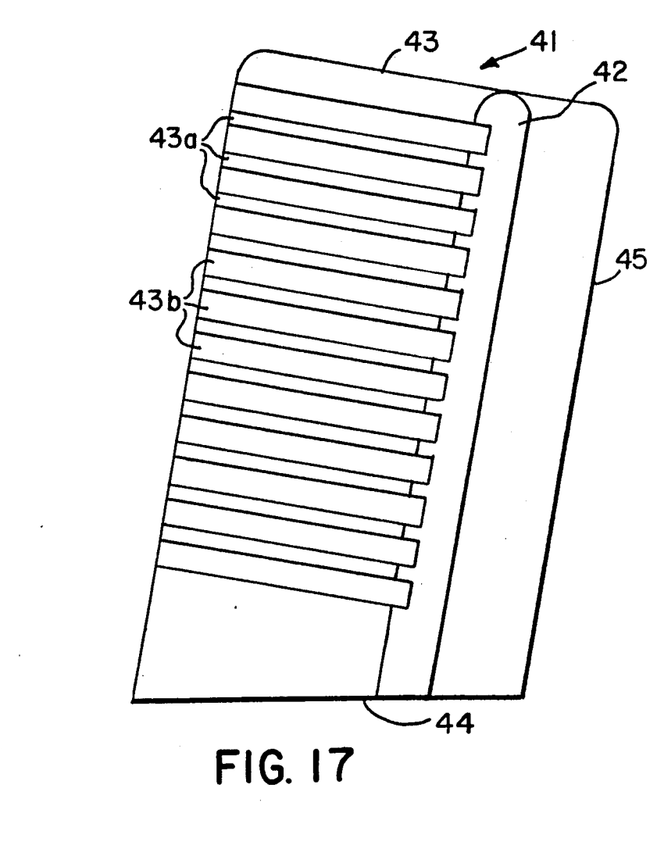
FIG. 17 is a side elevational view of the embodiment shown in FIG. 16.
Figure 18:
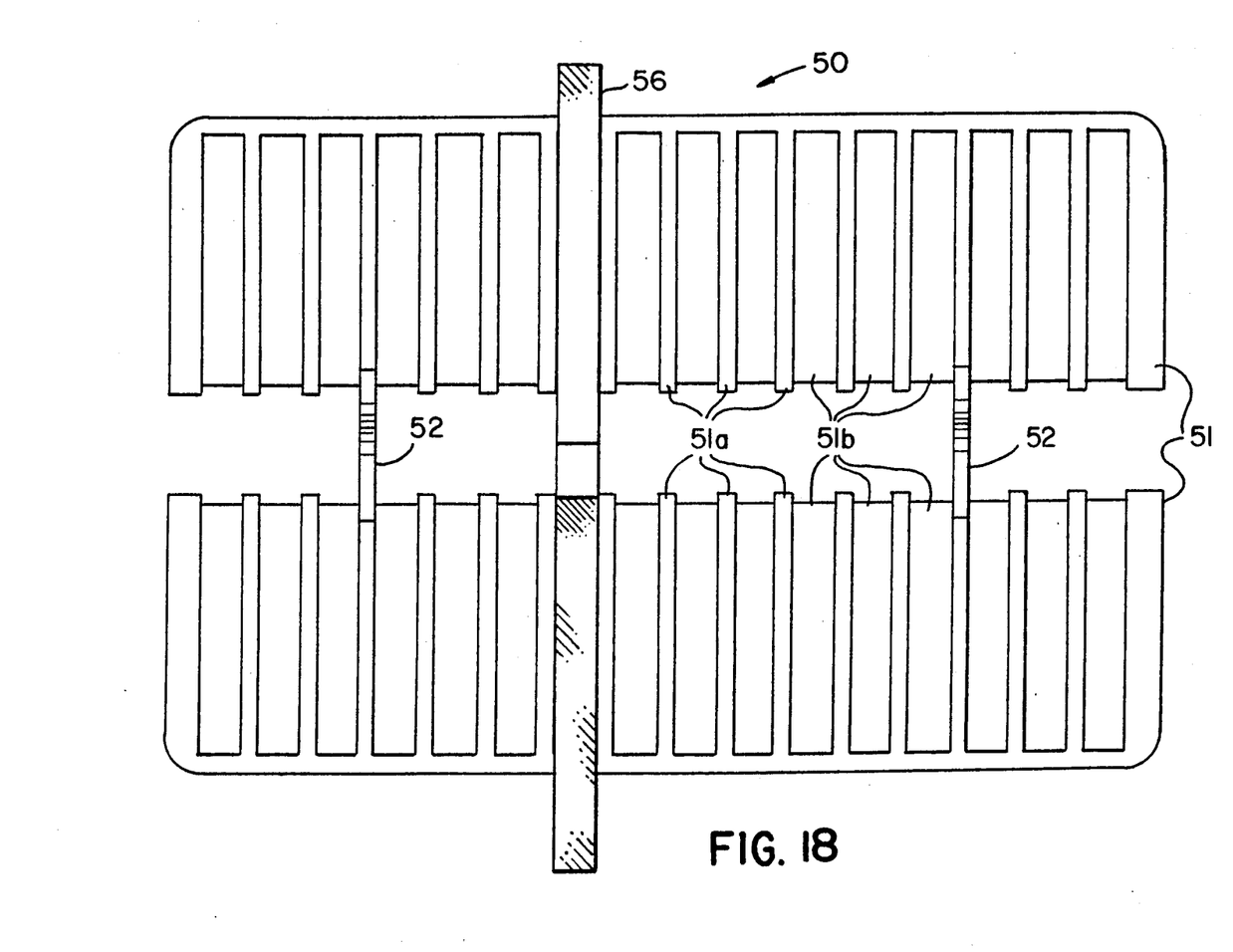
FIG. 18 is a top plan view of another embodiment of the invention with the storage rack in a horizontal position.

FIGS. 16 and 17 show still another embodiment of the invention somewhat similar to the one in FIG. 15 wherein a recording-media rack indicated generally by the numeral 41 has a pair of upwardly extending wall members 42 and a single wall member 43 centrally located between the members 42 and attached thereto by any suitable means. The wall members 42 can be made as one continuous wall with the rear edge of the wall 43 joined at right angles to the center thereof. The walls 42 have alternate transverse ribs 42a and grooves 42b therebetween. Similarly the wall 43 has ribs 43a and grooves 43b. The lower edge 44 of the rack 41 is truncated in such manner as to tilt the rack 41 rearwardly at an angle of approximately 10° from a perpendicular axis. This causes the wall 43 and the grooves 43b to be inclined rearwardly while the wall 43 lies in a vertical plane. The walls 42 lie in a common plane which is inclined rearwardly approximately 10 from a perpendicular axis. With this arrangement the rack 43 supports the recording media-boxes placed therein at an inclined angle similar to the rack 36 in FIG. 15. It has been found that an upwardly extending support rib 45 attached to the rear surface of the wall member 42 at the center thereof adds to the stability of the inclined rack 41. The rib 45 is preferably the same thickness as the wall member 43 and lies in the same plane as the member 43. The various parts of the rack 41 can be attached to each other by adhesive or any suitable means.

FIGS. 18 through 21 show still another modification of the invention in which the recording-media box storage unit or rack is indicated generally by the numeral 50. This version differs from the other embodiments since the rack 50 is positioned in a horizontal position and supports the media boxes in a vertical position.

The rack 50 has a pair of substantially identical wall members 51 held in fixed spatial and angular relationship to each other by a pair of substantially identical foot brackets 52. Both the walls 51 have a series of alternating ribs 51a and grooves 51b extending transversely across the upper face of each wall member.

Figure 20:
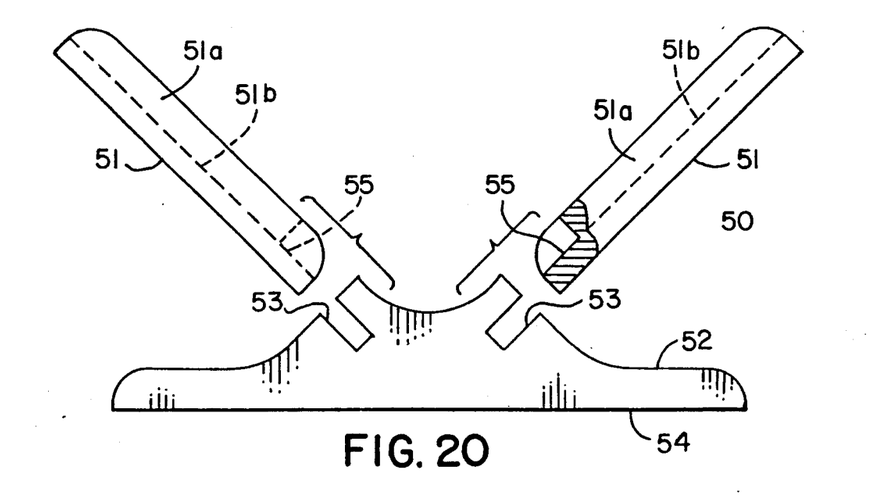
FIG. 20 is an exploded left end view of the embodiment shown in FIGS. 18 and 20.

As shown in FIG. 20 each foot bracket 52 has a pair of opposed slots 53 extend outwardly and upwardly from each side r of the bracket at a 45° angle to a horizontal bottom edge 54 of the bracket.

Figure 19:
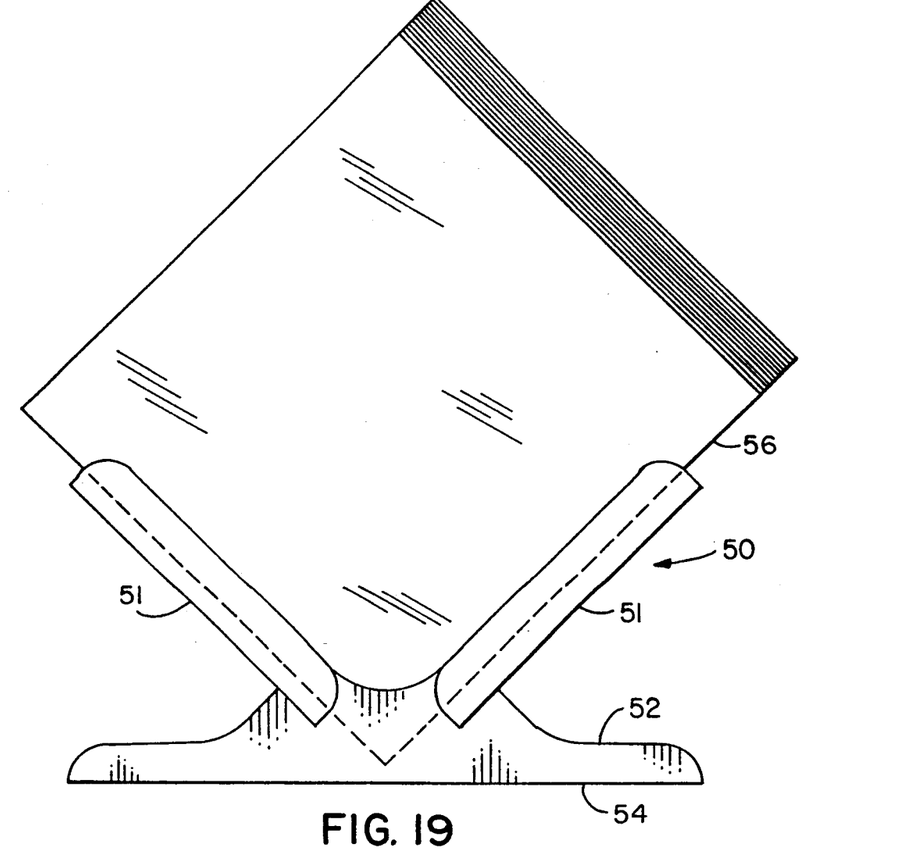
FIG. 19 is a left end view of the embodiment shown in FIG. 18.

Each wall member 51 has a cut-out notch 55 in the inner end of two of the ribs 51a to enable one edge of each wall portion to fit into one of the slots 53 of each of the brackets 52 as shown in FIG. 19.

When both the wall members 51 are assembled with the brackets 52 and the brackets are placed on a horizontal surface, the wall members lie in planes which intersect at a common horizontal axis and are at right angles to each other. The brackets 52 hold the wall members 51 at oppositely inclined angles which are 45° from the horizontal surface on which the rack 50 is placed. A typical CD recording box 56 is shown positioned in a pair of adjacent slots 51b in the rack 50 in FIGS. 18, 19 and 21.

Figures 21, 22:
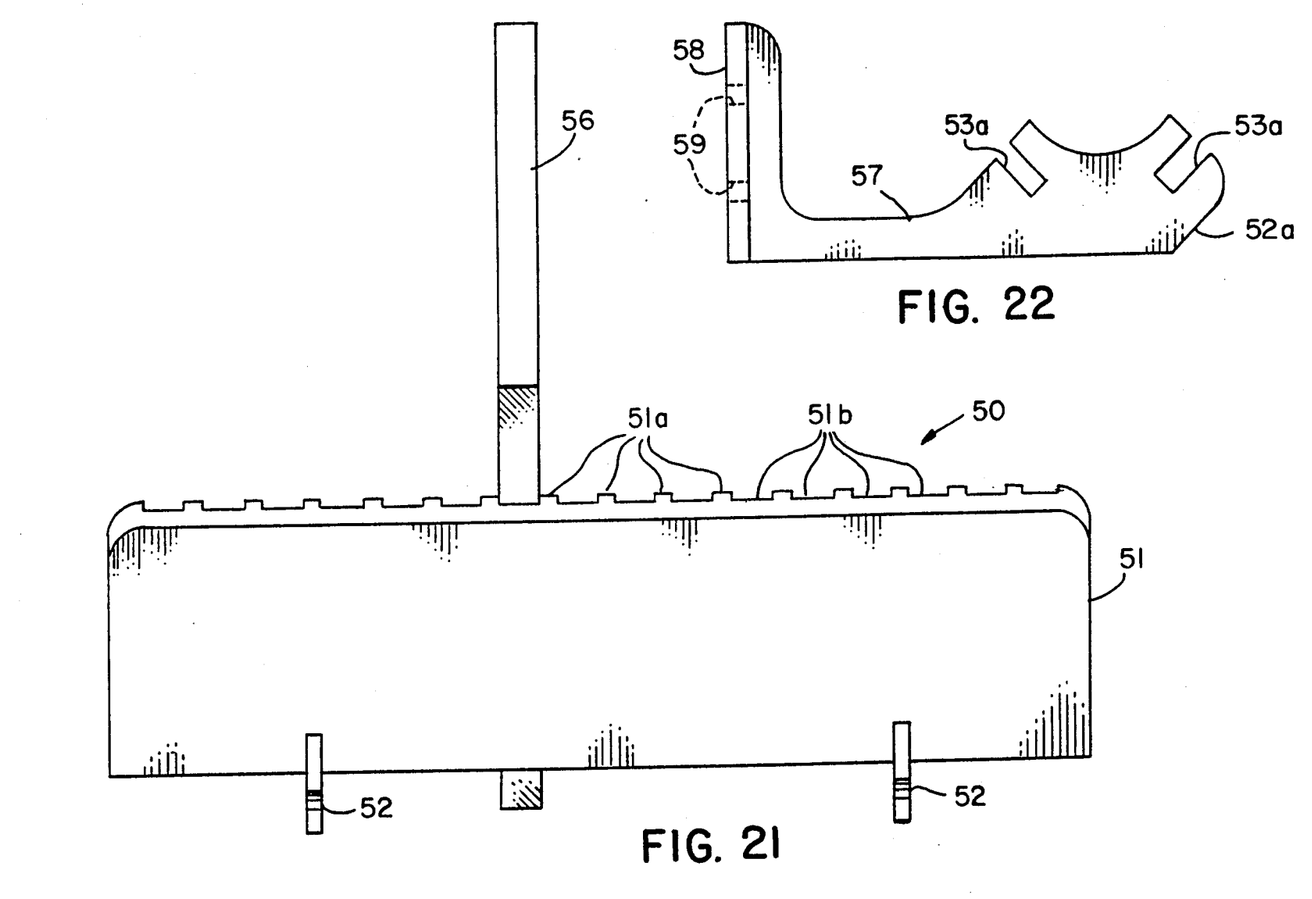
FIG. 21 is as front elevational view of the embodiment shown in FIGS. 18 through 20.
FIG. 22 is side elevational view of a modification of the bracket shown in FIG. 20 wherein the bracket is designed for mounting on a wall or other vertical surface.

FIG. 22 shows an alternative wall mountable bracket 52a which can be used with the wall members 51 instead of the foot bracket 52 when it is desired to mount the rack 50 on the wall. The bracket 52a has a pair of slots 53a for receiving the wall members 51, a rearwardly extending segment 57 with a right angled mounting flange 58 having a pair of holes 59 therethrough for fastening the bracket 52a to a wall.

It should be understood that the various embodiments of storage racks shown and described herein can be made from wood, metal, plastic or other various materials. These and various other modifications can be made herein without departing from the scope of the invention.

We claim:

1. A storage unit for supporting recording-media boxes in parallel spaced relationship from each other by engaging only two adjacent side edges of each box, said unit comprising:
  (A) at least one first wall member lying in a first plane;
  (B) at least one second wall member lying in a second plane which intersects at a common axis with and is perpendicular to the first plane and said axis is upwardly extending from a horizontal plane; and
  (C) connecting means fastening all of the wall members together in fixed angular relationship to each other;
  (D) each adjacent pair of said first and second wall members forming at least one corner support section for said recording-media boxes;
  (E) at least one face of each wall member having a series of alternate transversely extending parallel ribs and grooves;
  (F) the ribs and grooves on each first wall member lying in a plurality of parallel planes which are common to the planes of the ribs and grooves on an adjacent second wall member wherein each of said grooves on each said first wall member is aligned in one of the common planes with one of the grooves on the second wall member and one end of each of the grooves on the first wall member is adjacent to one end of one of the grooves on the second wall member so that each such pair of aligned grooves forms a substantially L-shaped groove configuration in which both grooves of the pair face toward each other in one of the said corner support sections so as to receive and support a pair of adjacent sidewall edges of a recording-media box in a plane parallel to other media boxes similarly supported by other pairs of grooves in the wall members, and whereby each adjacent pair of first and second wall members covers two adjacent sidewall edges of any recording-media box placed in the storage unit while leaving the two remaining sidewall edges of each media-box exposed for viewing.

2. A storage unit as claimed in claim 1 wherein the axis of intersection of the first and second planes is vertical when the storage unit is in its normal position of use.

3. A storage unit as claimed in claim 2 wherein both the first and second wall members lie in substantially vertical planes.

4. A storage unit as claimed in claim 1 including multiple width of grooves for receiving multiple sizes of recording media boxes.

5. A storage unit as claimed in claim 1 wherein at least one of the wall members lies in a substantially vertical plane and at least one other intersecting wall lies in a plane inclined at an angle lying between a vertical and a horizontal plane.

6. A storage unit as claimed in claim 1 wherein all of the wall members lie in planes inclined at an angle lying between a vertical and a horizontal plane.

7. A storage unit as claimed in claim 1 wherein the wall members have bottom edges truncated at such an angle as to cause the entire storage unit to stand in a rearwardly inclined position when placed in its normal position of use on a horizontal surface.

8. A storage unit for supporting recording-media boxes in parallel spaced relationship from each other by engaging only two adjacent side edges of each box, said unit comprising:
- (A) at least one first wall member lying in a first substantially vertical plane;
- (B) at least one second wall member lying in a second substantially vertical plane which intersects at a common axis with and is substantially perpendicular to the first vertical plane; and
- (C) connecting means fastening all of the vertical wall members together in fixed angular relationship to each other;
- (D) each adjacent pair of first and second wall members forming at least one corner support section for said recording-media boxes;
- (E) at least one face of each vertical wall member having a series of alternate horizontally extending parallel ribs and grooves;
- (F) the ribs and grooves on each of the said first wall members lying in a plurality of parallel planes which are common to the planes of the ribs and grooves on at least one said adjacent second wall member wherein each of the grooves on each said first wall member is aligned in a common plane with one of the grooves on the said second wall member so that each such pair of aligned grooves forms a substantially L-shaped groove configuration in which both said grooves of the pair face toward each other in one of the said corner support sections so as to receive and support a pair of adjacent sidewall edges of a recording-media box in a plane parallel to other media boxes similarly supported by other pairs of grooves in the wall members, and whereby each adjacent pair of first and second wall members covers two adjacent sidewall edges of any recording-media box placed in the storage unit while leaving the two remaining sidewall edges of each media-box exposed for viewing.

9. A storage unit as claimed in claim 8 wherein the connecting means includes a plurality of brackets extending between all of the vertical wall members.

10. A storage unit as claimed in claim 9 wherein each bracket has a plurality of outwardly extending slots with each slot engaging a portion of one of the vertical wall members along an edge thereof.

11. A storage unit as claim in claim 10 wherein each slot has a pair of opposed inwardly extending retaining bumps which engage matching holes or depressions on each side of one of the vertical walls, thereby locking the bracket in operative position on the wall.

12. A storage unit as claimed in claim 8 wherein each of said vertical wall members has a top edge, a bottom edge, and a pair of opposed side edges extending between the top and bottom edge and wherein the bottom edges of all the vertical wall members lie in a common plane.

13. A storage unit as claimed in claim 12 wherein the connecting means includes a substantially horizontal base member attached to the bottom edges of all the vertical wall members.

14. A storage unit as claimed in claim 8 including a pivot means to permit the vertical wall members to be rotated about a vertical axis to facilitate viewing of labels in the edges of boxes positioned in the grooves of the vertical walls.

15. A storage unit as claimed in claim 14 wherein the pivot means is a lazy susan attached to a horizontal base member which in turn is attached to the bottom edges of the vertical wall members.

16. A storage u nit as claimed in claim 8 wherein at least one first wall member has ribs and grooves on both faces thereof and a second wall member is mounted adjacent to each face of the first member, thereby forming a pair of said corner support sections, said second wall member having ribs and grooves in alignment with and in common planes with the ribs and grooves on each face of the first wall member.

17. A storage unit as claimed in claim 8 wherein all of the first and second wall members have ribs and grooves on both faces thereof.

18. A storage unit as claimed in claim 17 wherein the unit comprises a pair of first wall members and a pair of second wall members, with each of the first wall members located on opposite sides of the plane of the second wall members and each of the second wall members being located on opposite sides of the plane of the first members.

19. A storage unit as claimed in claim 8 in combination with a plurality of recording-media boxes placed in at least one of the corner support sections, wherein the boxes stored in the unit are positioned in the grooves so that the length of every other box lies in one direction and the length of all the remaining intermediate boxes lies at right angles to the length of the first mentioned group of boxes in order that every box will have one end that projects out farther than the ends of either of the adjacent boxes to provide easy gripping for removal of the boxes from the storage unit.

20. A storage unit as claimed in claim 8 wherein each of the vertical wall members is comprised of a plurality of wall sections stacked one on top of another and including mating edge connection means for retaining the vertically stacked sections in their intended position with respect to each other.

21. A storage unit for supporting recording-media boxes in parallel spaced relationship from each other by engaging only two adjacent side edges of each box, said unit comprising:
- (A) a pair of first wall members lying in a first substantially vertical plane;
- (B) a pair of second wall members lying in a second substantially vertical plane which intersects at a common axis with and is substantially perpendicular to the first vertical plane;
- (C) said first and second wall members forming a configuration of X-shaped cross section; and
- (D) connecting means attached to all of the vertical wall members to hold them in fixed angular relationship to each other;
- (E) each adjacent pair of first and second wall members forming at least one corner support section for said recording-media boxes;
- (F) both faces of each vertical wall member having a series of alternate transversely extending parallel ribs and grooves;
- (G) the ribs and grooves of each face of each first wall member lying in a plurality of parallel planes which are common to the ribs and grooves on an adjacent face of at least one of the second wall members wherein each of the said grooves on each first wall member is aligned in a common plane with one of the grooves on the said second wall member so that each such pair of aligned grooves forms a substantially L-shaped groove configuration in which both grooves of the pair face toward each other in one of the said corner support sections so as to receive and support a pair of adjacent sidewall edges of a recording-media box in a plane parallel to other media boxes similarly supported by other pairs of grooves in the wall members, and whereby each adjacent pair of first and second wall members covers two adjacent sidewall edges of any recording-media box placed in the storage unit while leaving the two remaining sidewall edges of each media-box exposed for viewing 22. A storage unit as claimed in claim 21 wherein the connecting means includes a plurality of brackets extending between all of the vertical wall members.

23. A storage unit as claimed in claim 21 each of said vertical wall members has a top edge, a bottom edge, and a pair of opposed side edges extending between the top and bottom edge and wherein the bottom edges of all the vertical wall members lie in a common plane.

24. A storage unit as claimed in claim 23 wherein the connecting means includes a substantially horizontal base member attached to the bottom edges of all the vertical wall members.

25. A storage unit as claimed in claim 24 wherein the horizontal base is attached to a rotatable lazy susan to permit rotation of the storage unit about a substantially vertical axis.

26. A storage unit as claimed in claim 21 including a pivot means to permit the vertical wall members to be rotated about a vertical axis.

27. A storage unit for supporting recording-media boxes in parallel spaced relationship from each other by engaging only two adjacent side edges of each box, said unit comprising:

(A) at least one first wall member lying in a first plane; and (B) at least one second wall member lying in a second plane which intersects at a common axis with and is perpendicular to the first plane and said axis is upwardly extending from a horizontal plane;

(C) all of the said wall members attached together in fixed angular relationship to each other;

(D) each adjacent pair of first and second wall members forming at least one corner support section for said recording-media boxes;

(E) at least one face of each wall member having a series of alternate transversely extending parallel ribs and grooves;

(F) each of the grooves on each of the first wall members lying in a common plane with and facing toward one of the grooves on one of the second wall members to form an L-shaped groove configuration in one of the said corner support sections so as to engage two adjacent side edges of a media-storage box while leaving two opposite adjacent side edges of the box exposed for viewing and easy removal from the storage unit.

* * * * *